US009152603B1

(12) United States Patent
Kelly, III

(10) Patent No.: US 9,152,603 B1
(45) Date of Patent: Oct. 6, 2015

(54) SYSTEM AND METHOD FOR INCREASING APPLICATION COMPUTE CLIENT DATA I/O BANDWIDTH PERFORMANCE FROM DATA FILE SYSTEMS AND/OR DATA OBJECT STORAGE SYSTEMS BY HOSTING/BUNDLING ALL OF THE DATA FILE SYSTEM STORAGE SERVERS AND/OR DATA OBJECT STORAGE SYSTEM SERVERS IN THE SAME COMMON GLOBAL SHARED MEMORY COMPUTE SYSTEM AS THE APPLICATION COMPUTE CLIENTS

(71) Applicant: Albert J Kelly, III, Chantilly, VA (US)

(72) Inventor: Albert J Kelly, III, Chantilly, VA (US)

( * ) Notice: Subject to any disclaimer, the term of this patent is extended or adjusted under 35 U.S.C. 154(b) by 201 days.

(21) Appl. No.: 13/732,043

(22) Filed: Dec. 31, 2012

Related U.S. Application Data

(60) Provisional application No. 61/582,342, filed on Dec. 31, 2011.

(51) Int. Cl.
*G06F 15/163* (2006.01)
*G06F 15/173* (2006.01)

(52) U.S. Cl.
CPC .................................. *G06F 15/17331* (2013.01)

(58) Field of Classification Search
CPC ............ G06F 13/28; G06F 3/00; H04L 12/28

USPC ......................................................... 709/213
See application file for complete search history.

(56) References Cited

U.S. PATENT DOCUMENTS

| 6,105,122 A * | 8/2000 | Muller et al. ...................... 712/1 |
| 2002/0029334 A1* | 3/2002 | West et al. ........................ 713/2 |
| 2005/0120160 A1* | 6/2005 | Plouffe et al. ..................... 711/1 |
| 2008/0120435 A1* | 5/2008 | Moreira et al. ................... 710/1 |

* cited by examiner

*Primary Examiner* — David Lazaro
*Assistant Examiner* — Zia Khurshid

(57) ABSTRACT

Compute client processes are currently limited to a small percentage of the data I/O bandwidth available from a parallel file system's total aggregate I/O bandwidth. I/O bandwidth is limited by the pathways linking the parallel file system's data storage servers to the clients process's computer system and the number of stops the data makes in route before arriving in the client's memory space. Both of these limitations are overcome by hosting the entire set of file system storage servers or object storage servers within the same common global shared memory, parallel computer system, as the requesting client process. The data moves once, in parallel, from the storage devices, directly to the storage servers memory, which is the same memory address space as the compute client. This provides the compute client with low-latency access to the "Entire Aggregate I/O Bandwidth" provided by all of the File System Data Storage Servers.

12 Claims, 5 Drawing Sheets

"Hosting/Bundling All File System Data Servers with the application compute client"
Method of Increasing I/O Bandwidth for the Bundled File System Client Using the "Bundled File System Data Servers" Method as a Rapid Data Transfer Device
Mobile Sensor Version – One Data Storage Subsystem Stack Using the "Bundled File System Data Servers" Method
as a Rapid Data Transfer Device
Fixed Site Version – Multiple Data Storage Subsystem Stacks

SYSTEM AND METHOD FOR INCREASING APPLICATION COMPUTE CLIENT DATA I/O BANDWIDTH PERFORMANCE FROM DATA FILE SYSTEMS AND/OR DATA OBJECT STORAGE SYSTEMS BY HOSTING/BUNDLING ALL OF THE DATA FILE SYSTEM STORAGE SERVERS AND/OR DATA OBJECT STORAGE SYSTEM SERVERS IN THE SAME COMMON GLOBAL SHARED MEMORY COMPUTE SYSTEM AS THE APPLICATION COMPUTE CLIENTS

CROSS-REFERENCE TO RELATED APPLICATIONS

This application claims the benefit of provisional patent application Ser. No. 61/582,342, entitled "Method for increasing File System I/O Bandwidth for a File Systems' Client by Hosting/Bundling all of the File Systems' Data Servers in the same Shared Memory Compute System with the specific File Systems' Client," filed Dec. 31, 2011, by the present inventor.

FEDERALLY SPONSORED RESEARCH

Not Applicable.

REFERENCES CITED

Not Applicable.

U.S. PATENT DOCUMENTS

U.S. Pat. No. 6,105,122 9/2000 P. Keith Muller et al
U.S. Pat. No. 7,721,009 B2 5/2010 Moreira et al.

BACKGROUND OF THE INVENTION

1. Field of the Invention

This invention is directed to the field of large data input/output (I/O) transfer into, and out of, large compute systems and large data storage systems. It is particularly directed towards reducing the data access latency times and increasing the data I/O transfer rates for compute clients processing extremely large data sets within large, shared-memory compute systems.

2. Description of Prior Art

Demand is growing to find solutions to the "big data" challenge faced by government and business, for example, in areas such as fraud detection, remote sensor data analysis, financial modeling, social network analysis, and risk analysis. Many data intensive computing applications need to process an enormous amount of data in a timely manner, and if too much time is spent loading a required data set into a compute client's memory, then the entire production workflow will be delayed. The same logic holds for processes that are generating very large data sets. The newly generated large data sets need to be quickly made available for the next step in the larger production workflow. To support such an environment, a supercomputer architecture is required that incorporates hundreds or thousands of CPU cores for handling multiple processing threads and supersized memories to hold more of the very large data sets. Simply put, the more data the supercomputer can process at any given time, the quicker the results are presented to decision makers. When it comes to mission-critical pattern discovery problems in government and business, whoever obtains the answers first is one step ahead of their adversary or competitor.

The challenges to meeting "big data" demands are many:
The compute hardware needs to be able to scale up to an extraordinary level—thousands of CPU cores and multiple terabytes of memory—which is far beyond the capacity of any commodity X86 server. Computer software needs to be able to take advantage of the scaled-up hardware platform. And, an extremely efficient data access input/output system that can quickly load the "big data" into system memory and just as quickly store the processed data onto reliable media is needed to complete the system.

The ability to build larger and larger compute systems has been facilitated by advances in massively parallel compute system techniques, algorithmic resource orchestration techniques (Map Reduce and others), low-cost/high-performance CPU's, and the advent of both open-source and proprietary Parallel File Systems. Parallel File Systems such as "Lustre" [See "Lustre scalable storage" Copyright 2006 Cluster File Systems —Rights owned by ORACLE Corp.], and IBM's GPFS (General Parallel File System) [Refer to F. B. Schmuck and R. L Haskin, GPFS: a shared-disk file system for large computing clusters, in proceedings of Conference of Files and Storage Technologies (FAST'02), 2002] have allowed these newer and larger parallel compute systems to scale up to higher and higher numbers of compute nodes and compute-cores and still have enough File System I/O Bandwidth to allow for very good compute performance on many classes of applications.

Parallel File Systems generate very high "Total I/O" Bandwidth levels by utilizing multiple "File System Data Storage Servers" like the dual socket server 110 in FIG. 1 (Lustre uses "Object Storage Servers (OSS's) and IBM's GPFS uses NSD Servers (Network Shared Disk Servers)). Each File System Data Storage Server (OSS or NSD Server) is attached to one or more "Data Storage Devices," like 109 in FIG. 1, via a storage network fabric 106 that in many HPC environments is implemented using Infiniband (IB) switches and (IB) Host Channel Adapters (HCA's) 104. The "Data Storage Device" 109 often consists of a "Storage Controller" 107, and a High-Performance or High-Capacity Disk Storage Devices 108 or Solid-State Disk (SSD) Storage Devices (many new systems are using SSDs in combination with SATA or SAS Disks to balance total I/O operations with total storage capacity). Sometimes "File System Data Storage Servers," like 110 in FIG. 1, are paired with Storage Subsystems, like 109 in FIG. 1, that are implemented as raw "Trays-of-Disks" without Disk-Controllers. These Trays-of-Disks are referred to as JBOD's (just a Bunch Of Disks), and require additional Data-Block management software to run within the "File System Data Storage Server" 110 to accomplish the functionality required for the "JBOD" to serve as a suitable Storage Device 109. The "Zetta File System," or ZFS [open source licensed By Oracle Corp.], is one candidate application for handling JBOD's and is being utilized by the Lawrence Livermore National Labs (LLNL) team, in combination with the Lustre File System as a part of their "Next-Generation" Sequoia Super Computer installation which hopes to have a "Total File System I/O Bandwidth of between 500 GB/s and 1000 GB/s.

The data blocks in the Parallel File System are "Striped" or spread across multiple "File System Data Storage Servers," like the 111 grouping of FIG. 1, and their associated collective sets of Storage Devices 113 in FIG. 1. The sequence of events for a compute client to receive the data stored in the Parallel File Systems after a client data request is:

1—The data blocks are copied from "Disk Storage Devices—108 data storage locations" and into "Storage Controllers 107 memory—Data Movement #1, 2—The data blocks are then copied from "Storage Controller 107 memory" into "File System Data Storage Servers 110 memory"—Data Movement #2, 3—The data blocks are then copied from all of the "File System Data Storage Servers 110 memory" into the client 101-1 memory space—Data Movement #3.

Moving the data blocks three times before they can be utilized is very inefficient, but for many parallel applications the inefficiency is accepted as current practice and the job schedules are allocated by compute time required as well as data I/O transfer time. All of these "Data Movement processes" are running in parallel, simultaneously across all of the File System Data Storage Servers and their respective Storage Controllers and Disk Storage Devices. The aggregate data I/O speed for the entire File System is a function of the available bandwidth for all of the File System Data Storage Servers operating in unison. The grouping of File System Data Storage Servers 111 in FIG. 1 has the potential I/O bandwidth of 8 GB/s because each of the 4 servers can maintain 2 GB/s and the set of 2 disk Storage Devices, 109 in FIG. 1, can each maintain 4 GB/s.

The total I/O performance of the Parallel File Systems can be scaled up by adding more File System Data Storage Servers, see 201 in FIG. 2, and more Disk Storage Devices, 202 in FIG. 2. The additional server and storage resources allow the example Parallel File System in FIG. 2 to provide an aggregate potential data I/O bandwidth of 20 GB/s instead of the original potential of I/O speed of 8 GB/s. The combination of adding more Storage Servers and more Storage Devices creates a very high Total potential I/O Bandwidth solution for use by the massively parallel compute systems and their applications.

The use of Parallel File Systems, like Lustre and GPFS, for massively parallel compute systems has worked well because each compute node in the massively parallel compute system typically needs to use only a small portion of the I/O Bandwidth to accomplish its compute tasks and to deliver intermediate or final results. The High Speed Parallel File Systems in use at Large Supercomputing Centers are used to take very rapid "Snap-shots" of intermediate compute results for complex compute jobs that can sometimes take days or weeks to complete. The snapshots are called "Check Points" and they require very High Total I/O Bandwidth since each of the many thousands of compute nodes are sending copies of their intermediate compute results out for analysis and algorithmic tuning.

One of the HPC systems at Oak Ridge National Laboratory, Jaguar, has over 26,000 compute nodes with approximately 180,000 compute-cores, and its Lustre Parallel File Systems operate at 240 GB/s and 44 GB/s. That meant that each "File System Client", like 101-2 in FIG. 1, on a small compute node, could "Simultaneously Share" about 9-12 MB/s on average of the "Total File System I/O," when all of the many thousands of compute nodes were working together in parallel on one large problem. The peak File System I/O performance for a single specific "File System Client," like 101-2 in FIG. 1, on a Jaguar compute node was just over 1.25 GB/s. This means that the peak "File System Client" I/O Bandwidth performance available for a single node on Jaguar is 0.5% of the "Total I/O" Bandwidth available from the entire File System. This level of I/O performance works very well for the large scale scientific simulation problems that have been tailored to work on the massively scaled parallel compute systems like "jaguar" with it's thousands of separate compute nodes that typically begin processing jobs with a few small-sized data sets for each compute node. But there are many additional types of compute problems that require the manipulation and processing of very large data sets that must first be loaded into the memory space of one compute system before processing can begin.

Many US Government projects have requirements to rapidly access and process large numbers of files in the 5 GB to 15 GB range. There are many fielded systems are producing data sets at a rate of 1 Tera Byte (TB) or more per hour, and there are several ongoing projects that produce data sets that range from 4 to 6 TB in size. The users of these large, Multi-TB data sets would like to have the ability to rapidly load and process entire multi-TB files in "Large Shared Memory" compute systems, like 112 in FIGS. 1 and 2, and utilize the compute systems 100's or 1000's of compute-cores to reduce the "Raw multi-TB" data sets into useful, user friendly, result sets. The task of crafting algorithms to process these Very Large Multi-TB data sets is much easier to accomplish if the entire data set can fit within the internal memory address space of a large "Common Global Shared Memory" compute system and be acted on by all of the 100's or 1000's of compute-cores resident with the single large "Common Global Shared Memory" compute system.

An example of using a "Common Global Shared Memory" compute system in combination with a typical Parallel File System to process very large data sets can be further examined by using the performance characteristics of Oak Ridge's "Jaguar" Supercomputer. Jaguar's "Peak I/O Performance" for a single compute node was 1.25 GB/s. Using that I/O Bandwidth value for the I/O performance of a single "File System Client" within a "Large Shared Memory" compute system, such as 112 in FIG. 1 or 2, results in a 15 GB file loading into the "Large Shared Memory" Compute system in just 12 seconds. An acceptable data I/O transfer time for many situations. But the time required to load a 6 TB file from a modular storage device or a current implementation of a typical Parallel File System, 111 and 201 and 202 from FIG. 2, into the same large "Common Global Shared Memory" compute system, 101-1 in 112 of FIG. 2, would be at least 4,800 seconds! Having 100's or 1000's of processing cores waiting over 4,000 seconds for a data set to load into a system like 112 in FIG. 1 or 2, would be a terrible waste of an expensive compute resource.

The "Peak I/O bandwidth" available for a specific application compute client from the total aggregate I/O provided by the Parallel File Systems' entire collection of "File System's Data Storage Servers," like 111 and 201 added together in FIG. 2, can be limited by many of the physical and logical elements that interconnect a typical Lustre or GPFS Parallel File System implementation.

A significant implementation element that can limit the "I/O Bandwidth Performance" for a specific "File Systems' Client" is the total number, and bandwidth capacity, of the physical or logical I/O network pathways available to link the specific "Application Compute Client" with the "Data Storage Servers" of the Parallel File System. The designs and implementations of "Application Compute Clients" will vary across the range of commercially available Parallel File Systems. The number of I/O network pathways supported by a specific "Application compute client" implementation, combined with the I/O bandwidth available for "Application compute client" use within each supported I/O network pathway, will significantly affect the total I/O Bandwidth for the specific "File System Client."

The physical linkage between the "Application compute client" processes 101-1 and the collective set of "File System Data Storage Servers" 111 and 201, is depicted in FIGS. 1 and 2 with the HCA's 104 supporting the external I/O connectivity from the 101-1 Client within the large "Common Global Memory Compute System," 112, and the Infiniband Switch 105 that in-turn provides the I/O network pathway connectivity to the entire collection of "File System Data Storage Servers" 111 and 201 in FIG. 2.

One specific current example of how a Parallel File System's design and implementation of its "Application compute client" can limit the total amount of File System I/O Bandwidth available to a specific "Application compute client" is Lustre's current Client design and implementation. As currently implemented, a Lustre Client can have one physical Infiniband connection. This means that a QDR (Quad Data Rate=4 GB/s) or DDR (Double Data Rate=2 GB/s) IB connection between a Lustre File System Client 101-1 and HCA 104 in FIG. 2 over to the 105 IB switch, would be the only I/O pathway between the Lustre File System Client and the collection of "File System Data Storage Servers" (OSS's for Lustre). Current Lustre Client instances utilizing a single QDR IB connection as its I/O network pathway to the "File System Data Storage Servers" have been able to achieve sustained I/O rates of up to 3.2 GB/s after considerable tuning adjustments were made, and while the Lustre Client was servicing several separate processes within a "Large Shared Memory" compute system with data blocks from several unique files that were striped across all of the "File System Data Storage Servers" (OSS servers) within the specific Lustre File System.

A redesign and re-implementation of the Lustre Client software would be required to permit the Lustre "File System Client" process to utilize two or more physical IB connections as its I/O network pathway to the "File System Data Storage Servers." An implementation that allowed a Lustre File System Client to utilize two QDR IB connections would potentially be able to achieve I/O bandwidth rates up to a maximum of 6 or 7 GB/s, but even this level of File System Client I/O Bandwidth performance is still a very small percentage of the total I/O Bandwidth available from Parallel File Systems that can achieve 100's of GB/s of total I/O Bandwidth. If the File System Client 101-1 in 112 of FIG. 2 was able to operate at 6 GB/s of I/O Bandwidth, it would still be utilizing less than ⅓ of the total potential File System I/O of 20 GB/s derived from the Parallel File System's "File System Data Storage Servers" in 111 and 201 in FIG. 2.

Existing Parallel File Systems (like Lustre and GPFS) perform well at distributing a small share of the total file system I/O to the thousands of compute nodes in today's large supercomputing compute clusters. However, for cases where very large data files need to be quickly loaded into a single, multi-processor compute node, the existing Parallel File Systems are not capable of providing more than a very small percentage of the total I/O Bandwidth to an individual compute client. A more efficient use of the Large Shared Memory Compute System, 112 in FIG. 2, would be had if there were a way for all of the Parallel File Systems aggregate I/O to be available for the compute client or clients within the Large Shared Memory Compute system.

Therefore, there is a need for a solution to improve the "Peak I/O Bandwidth Performance" for a single "File System Client," 101-1 in FIGS. 1 and 2, in a large "Common Global Shared Memory" Compute System, 112 in FIGS. 1 and 2.

BRIEF SUMMARY OF THE INVENTION

In accordance with one embodiment of the invention, a system and method for implementing improved compute client data I/O performance from a Parallel File System comprises a Large Shared Memory Compute System with access to multiple Data Storage Devices, having an allocated sub-set of the internal compute resources assigned to perform all Parallel File System data access processes within each of their own process allocations of shared-memory segments, for data block access and data sharing, and then the internally hosted compute clients, within the Large Shared Memory Compute System, would benefit from the full aggregate data I/O bandwidth available from the combination of all the Data Storage Devices and Parallel File System processes by being able to utilize Direct Memory Access (DMA) to access all of the shared-memory segments containing the requested data blocks that were placed into the shared memory space of the Large Shared Memory Compute System at the access speed of the bandwidth of the memory system within the Large Shared Memory Compute System. The data movement from storage to client would be accomplished in one step, since the client and the Parallel File Systems processes would be operating within the one shared-memory space. The idea is to completely avoid the complexity and performance impact typically required when switching between data movement between various separate compute nodes, I/O nodes, File System nodes, and across message passing interfaces over compute cluster interconnects. All of the desired data would move in parallel between data storage and compute memory, or in parallel between compute memory and data storage, without any time-consuming, extraneous stopovers in-route.

Advantages

Compute clients within the Large Shared Memory Compute System described above would not be limited to a small percentage of the I/O derived from the aggregate of File System Servers or Data Storage Servers. And data access latency would be improved since the data would only have to be moved from storage directly into the memory space of the Large Shared Memory Compute System where the client would have direct DMA access to it. If a client within the Large Shared Memory Compute System requested access to a specific 20 GB data set, contained within the Parallel File System storage, and each of the ten File System Server processes, 110 of FIG. 3, hosted within the Large Shared Memory Compute System, 112 of FIG. 3, were each capable of receiving 2 GB/sec of data blocks from the interconnected Data Storage Devices, and if each of the processes were to fetch 2 GB of data from the Data Storage Devices and place their 2 GB portions of data into the specifically allocated shared-memory segments, then the requesting client within the Large Shared Memory Compute System would have Direct Memory Access (DMA) to all ten of the 2 GB portions of data blocks, the entire 20 GB data set, after approximately 1 second. A data I/O bandwidth rate of 20 GB/sec is a large improvement over the Prior Art implementations that would be limited to transferring data from the externally hosted File Systems Servers via the external interconnect fabric that typically allows for a maximum data transfer of 1-3 GB/sec. Even if the 3 GB/sec transfer rate was achievable, the time to transfer a 20 GB file would be over six times slower at 6.6 seconds compared to 1 second. The typical Prior Art Parallel File System configuration would also have the data moving two or three times before reaching the memory space of the compute client. The improved method reduces the data movement to two moves, if a data storage controller is utilized, or down to a single data movement, if the File System Data Servers are performing the data storage controller functions (as in the case of a system utilizing the ZFS file system for data storage management within the data storage devices).

The data I/O performance of this new configuration, of Bundling all of the parallel File System Data Servers within the same Large Shared Memory compute systems as the compute clients, would be very close to the combined I/O bandwidth performance of all of the back-end data storage systems or all of the combined I/O bandwidth performance of the entire set of File Systems Data Servers within the Large Shared Memory Compute System.

DRAWINGS

REFERENCE NUMERALS

Figure 1:
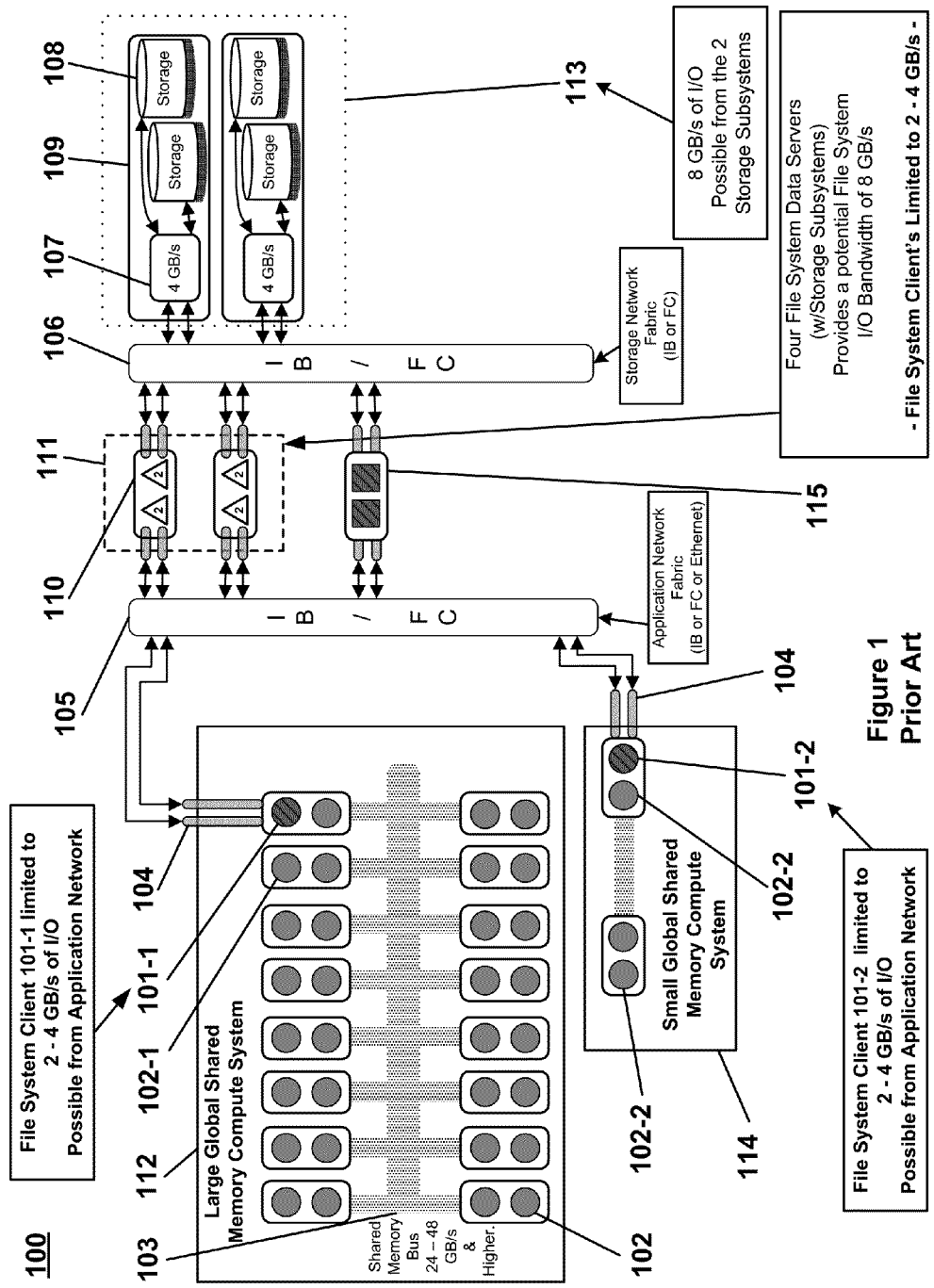
FIG. 1 is a Prior Art overview diagram of how current High Performance Computing (HPC) systems utilize multiple File System Data Storage Servers in parallel to achieve higher overall File System Input/Output (I/O) Bandwidth rates for a multitude of compute clients.
Figure 2:
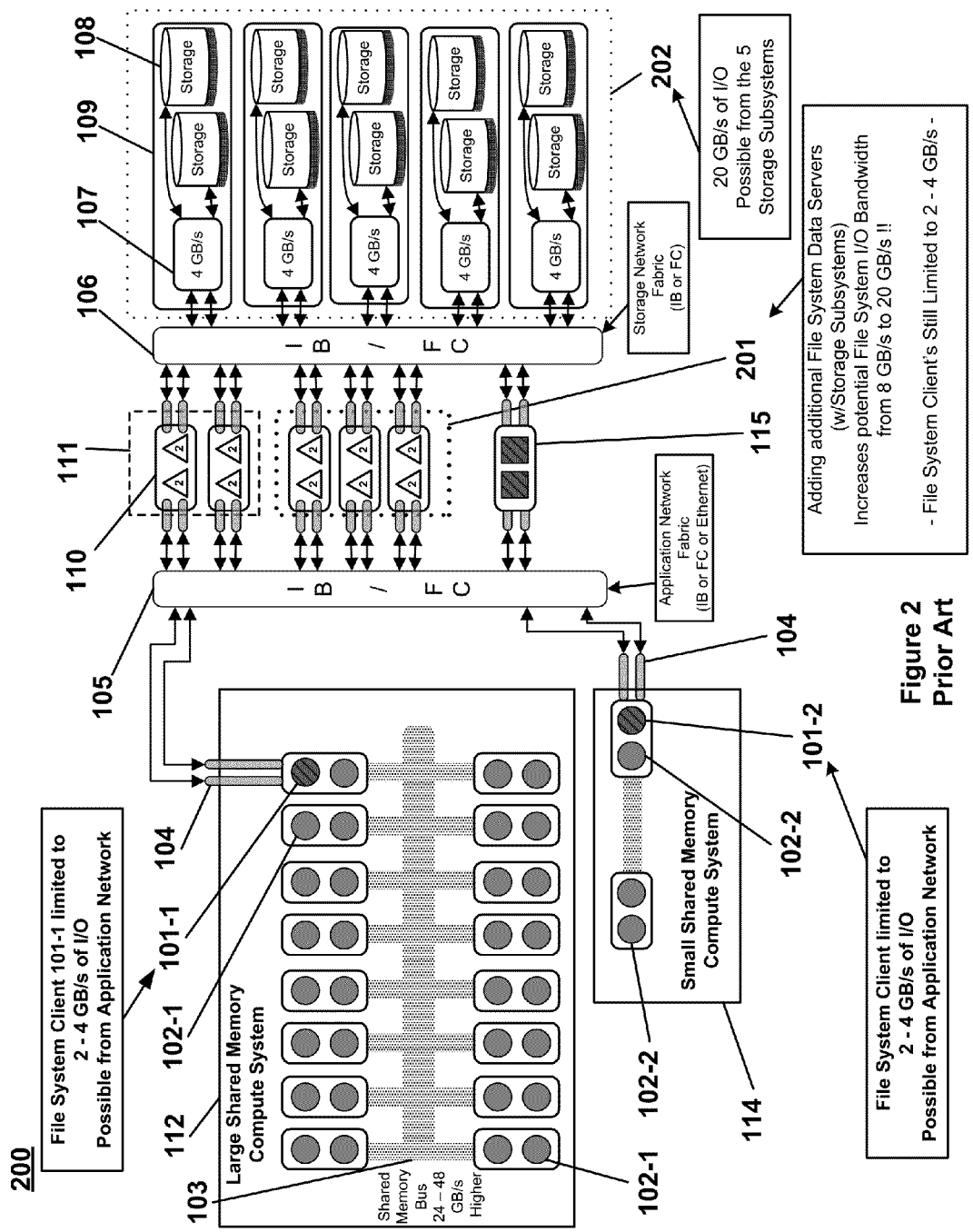
FIG. 2 is a Prior Art overview diagram of how the overall I/O Bandwidth of a parallel File System in an HPC environment is increased by incorporating additional File System Data Storage Servers and additional Storage devices to the File System.
Figure 3:
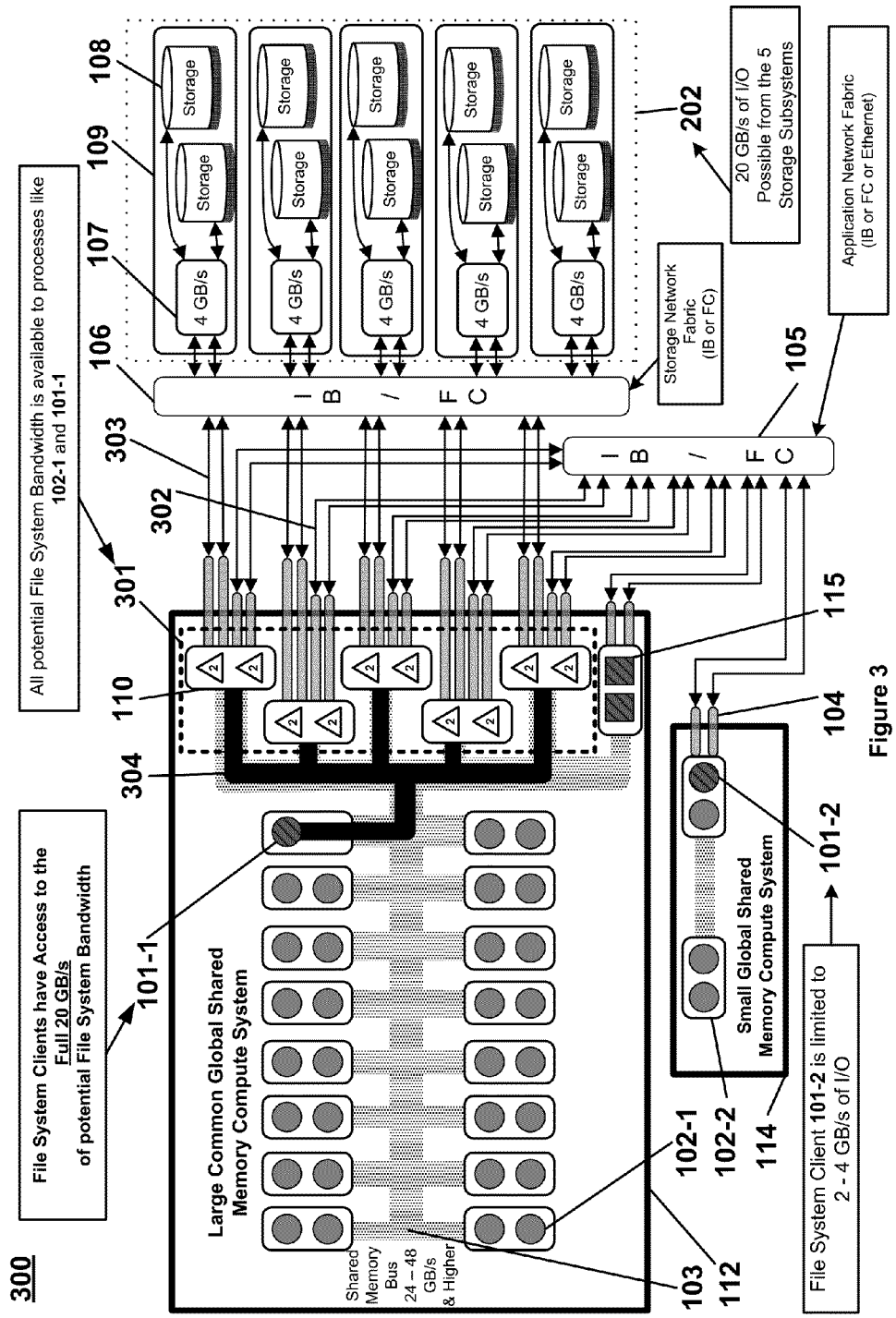
FIG. 3 is a depiction of the method to increase the File System I/O Bandwidth available to a specific File System or data object storage Client by Hosting/Bundling all of the File Systems Data Storage Servers in the same "Common Global Shared Memory" Compute System as the specific application compute client (up to the maximum potential I/O limit of the specific File System)

100—FIG. 1 Prior Art
101-1—File System Client hosted within a large "Common Global Shared Memory" compute system
101-2—ile System Client hosted within a small "Common Global Shared Memory" compute system
102-1—A processing node within a large "Common Global Shared Memory" compute system
102-2—A processing node within a small "Common Global Shared Memory" compute system
103—The Common Global Shared Memory Subsystem within a large "Common Global Shared Memory" compute system
104—The Host Channel Adapter for the compute node
105—An Infiniband or fibrechannel switch between the File System Clients and the File System Data Storage Servers (the Application Network Fabric)
106—An Infiniband or fibrechannel switch between the File System Clients and the File System Data Storage Servers (the Storage Network Fabric)
107—A storage controller/server
108—Storage devices—Disks or Solid State Storage
109—A Storage Subsystem
110—A File System Data Storage Server for a Parallel File System (an OSS or NSD server)
111—A set of File System Data Storage Servers for a Parallel File System
112—A large "Common Global Shared Memory" compute system
113—A complete set of Storage devices for a Parallel File Systems' storage needs
114—A small "Common Global Shared Memory" compute server
115—The Parallel File System meta data and control servers (Lustre MDS and MDT)
200—FIG. 2—Prior Art
201—An addition set of Storage Subsystem for the Parallel File System
202—The complete set of Storage devices in FIG. 2—20 GB/s of potential I/O
300—FIG. 3—Hosting/Bundling all data file storage servers system or data object storage servers within the same Common Global Shared Memory as the application compute client
301—All of the Parallel File Systems' Data Storage Servers Hosted/Bundled within the large "Common Global Shared Memory" compute system
302—The network connections linking the File System Data Storage Servers to the external InfiniBand or FibreChannel switch so that external File System Clients can access the Parallel File System
303—The network connections linking the File System Data Storage Servers to the Data Storage network switch, so that the Data Storage Subsystem can service the Hosted/Bundled File System Data Storage Servers
304—The DMA access pathway between the File System Client in the "Large Shared Memory" compute system and the Hosted/Bundled File System Data Storage Servers with the same "Large Shared Memory" compute system. This is where the High performance I/O for the File System Client is derived
401—A portable container that holds several Data Storage Subsystems for use in Data Collection and Data transfer in field situations
402—A Quick connect/Quick disconnect device that allows the 401 container to be securely connected to the internal Storage Subsystems as well as connecting to the 403 device that provides Data Storage Subsystem connectivity for the Hosted/bundled File System Data Storage Servers
403—The File System Data Storage Servers side of the Quick Connect/Disconnect system that provides connectivity between the File System Data Storage Servers and the Data Storage Devices
501—A second portable container that holds several Data Storage Devices for use in Data transfers between multiple collection platforms and for high-speed transfers to other 401 and 501 devices

DETAILED DESCRIPTION OF A SAMPLE EMBODIMENT

A system and method for increasing the application compute client data I/O bandwidth performance from data file systems or data object storage systems can be achieved by hosting/bundling all of the data file system storage servers or data object storage system servers for the entire parallel file system, in the same common global shared memory compute system as the application compute clients.

An embodiment of this novel re-arrangement of the existing elements of a typical Parallel File System is depicted in FIG. 3. Item 301 in FIG. 3 shows the "Bundled File System Data Storage Servers" within the large "Common global Shared Memory" compute system 112. This new method changes the pathway linking the "File System Client" and the "File System Data Storage Servers" from being an external I/O network pathway like 105 in FIG. 2, to a Direct Memory Access (DMA) pathway depicted as 304 within 103 from FIG. 3. The memory bandwidth of the large "Common Global Shared Memory" compute system now serves as the pathway between the "File System Client" 101-1, and the entire collection of "File System Data Storage Servers" 301 that generate all of the aggregate I/O bandwidth for the entire Parallel File System. The "Application Compute Client" shown as 101-1 in FIG. 3 can potentially access the full 20 GB/s of "Parallel File System" I/O Bandwidth generated by the Hosted Bundle of "File System Data Storage Servers" 301 via a Direct Memory Access (DMA) 304 within the memory subsystem 103 that is implemented within the large "Common Global Shared Memory" compute system 112 shown in FIG. 3.

The memory I/O bandwidth performance of the memory Subsystem 103 within the large "Common Global Shared Memory" compute system 112 now becomes the largest limiting factor in determining the Peak I/O bandwidth available for the "File System Client" 101-1 operating within the large "Common Global Shared Memory" compute system 112.

A nice feature of this novel arrangement of "Parallel File System" elements, is that external "File System Clients," like 101-2 in FIG. 3, can still access the entire "Parallel File System" via the same methods and processes that were used before the "File System Data Storage Servers" 301 were Bundled into 112. The Hosted/Bundled "File System Data Storage Servers" 301 are still connected to IB switch 105 via 302, and they are still connected to the Storage Subsystems via 303. The I/O Bandwidth available for external "File System Clients" like 101-2 remains the same, as it was when the "File System Data Storage Servers" were in their original separate server instances like 111 and 201 in FIG. 2.

The efficient hosting the Parallel File Systems' full complement of File System Data Storage Servers in the same "Common Global Shared Memory" compute system as the specific File System Client process would require the careful integration of the following major sub elements of the large "Common Global Shared-Memory" compute system:

1. For all "Hosted/Bundled" File System Data Storage Servers—Physical or logical connections between each specific "run time" instance of a specific File System Data Storage Server process, or data object storage process and it's specific "Back-End" data storage device or data storage subsystem would need to be implemented to insure that adequate I/O network pathways 106 and 104 were sized and maintained to insure that the Storage devices 109 were able to service all of the data I/O requests of the Hosted/Bundled File System Data Storage Servers 110 in FIG. 3,
   a. For instance, the compute socket 110 in FIG. 3 is depicted as hosting two instances of "File System Data Storage Servers," where each server can support the continuous transfer of 2 GB/sec. Both of the two processes in 110 can together support a sub-total of 4 GB/sec. The storage connectivity or network storage connectivity, 303 and 106 in FIG. 3, connections between 110 and a specific storage system, 109 in FIG. 3, would need to be properly sized to support a total I/O bandwidth of at least 4 GB/sec to realize the full potential bandwidth of both the storage device and the two File Systems Data Storage Servers.

2. All of the required File System Data Storage Servers software processes (from Lustre or GPFS or a similar Parallel File System) for the Parallel File System specific I/O data handling of all data-blocks and data-streams between the application compute client's and the File System Data Storage Servers physical or logical data storage devices or systems, 3. Methods and processes for the application compute client's "run time" process to have Direct Memory Access (DMA) to the appropriate memory regions of the "Common Global Shared Memory" compute system so that the total I/O bandwidth between the specific application compute client and the aggregate I/O provided by all of the large "Common Global Shared-Memory" Hosted/Bundled "File System Data Storage Servers" is increased up to the limit of the memory bandwidth of the "Shared-Memory" compute system. This is accomplished by utilizing specific operating systems application programming interface commands to synchronize the data retrieval and data placement actions of the separate processes and to designate specific shared-memory regions within the Large Shared Memory Compute System for use by compute clients and by the collection of File System Data Storage Server processes to use for providing data access services for the compute clients.
   a. In a typical modern LINUX implementation, shared-memory enables multiple processes to share the same region (called a segment) of memory (i.e., the same page frames are mapped into the memory of multiple processes). Since access to user-space memory is a fast operation, shared-memory is one of the quickest methods of inter-process communication (IPC): once one process has updated the shared-memory, the change is immediately visible to other processes sharing the same segment. [Refer to "The LINUX Programming Interface," Copyright 2010 by Michael Kerrisk]. When each of the multiple File Systems Data Servers, operating in parallel, have completed placing their portion of the requested data blocks into their specified shared-memory segments, the compute clients would have immediate DMA access to the multiple sets of data blocks that had just been placed into the multiple shared-memory segments by the File System Data Server processes.
   b. Synchronizing and orchestrating the actions between the collection of File System Server processes and the clients is accomplished within the Large Shared Memory Compute System by utilizing LINUX semaphores. Semaphores permit multiple processes to synchronize their actions. A semaphore is a kernel-maintained integer value that is visible to all processes that have been granted the necessary permissions. A File Systems Server process can indicate to its peers and Data I/O clients that it is performing a specific data access or data placement action by making an appropriate modification to the value of the semaphore. [Refer to "The LINUX Programming Interface," Copyright 2010 by Michael Kerrisk].

This method would allow a specific application compute client to access the "Entire Aggregate Bandwidth" provided by all of the File System Data Storage Servers processes within the Parallel File System up to the bandwidth limit of the "Common Global Shared-Memory" compute system. File System Clients external to the "Hosted File System Servers" that are residing within the "Common Global Shared-Memory" compute system would still be subject to the same "Channel I/O link" limiting factors as the Prior Art implementations, but would still have shared access to the parallel file System or object storage system. Processes running within the "Common Global Shared Memory" compute system would be serviced by the Internal File System I/O Clients via Common Global shared memory access and DMA procedures and would have full I/O access up to the limit of bandwidth of the Common Global Shared Memory compute system.

Figure 4:
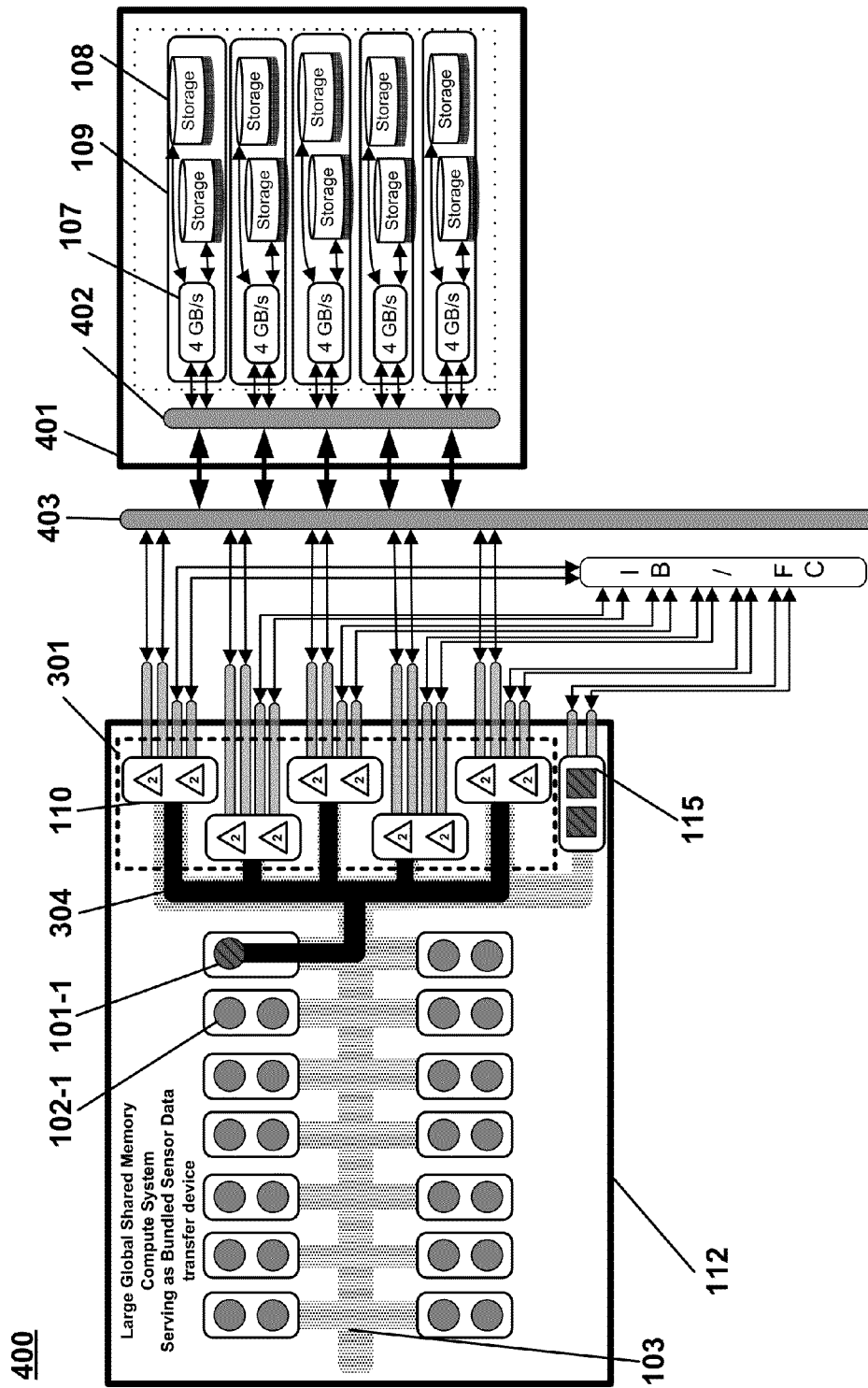
FIG. 4 is a depiction of an implementation that utilizes the "Hosted/Bundled File Systems Data Storage Servers" as part of a modularized Data capture and High-Speed Data transfer system for mobile Sensor systems that generate very large data sets.

Having very fast I/O bandwidth for application client's within a large common global shared memory machine will be very useful for a variety of applications. In the earlier case, where a 6 Tera Byte data file needed to be transferred from a modular storage device into an analysis environment, the previously accepted performance would effect the transfer at 1.25 GB/sec for a total of 4,800 seconds. With all of the data storage servers working in parallel, 301 in FIG. 3, within the same common global shared memory compute environment, the transfer to compute client 101-1 in FIG. 3 could approach 20 GB/sec and would be complete in approximately 300 seconds! In order to achieve those transfer rates, the data sets need to be presented in formats compatible with the parallel file systems being used in the common global shared memory compute system. One embodiment of such a configuration is depicted in FIGS. 4 and 5.

Figure 5:
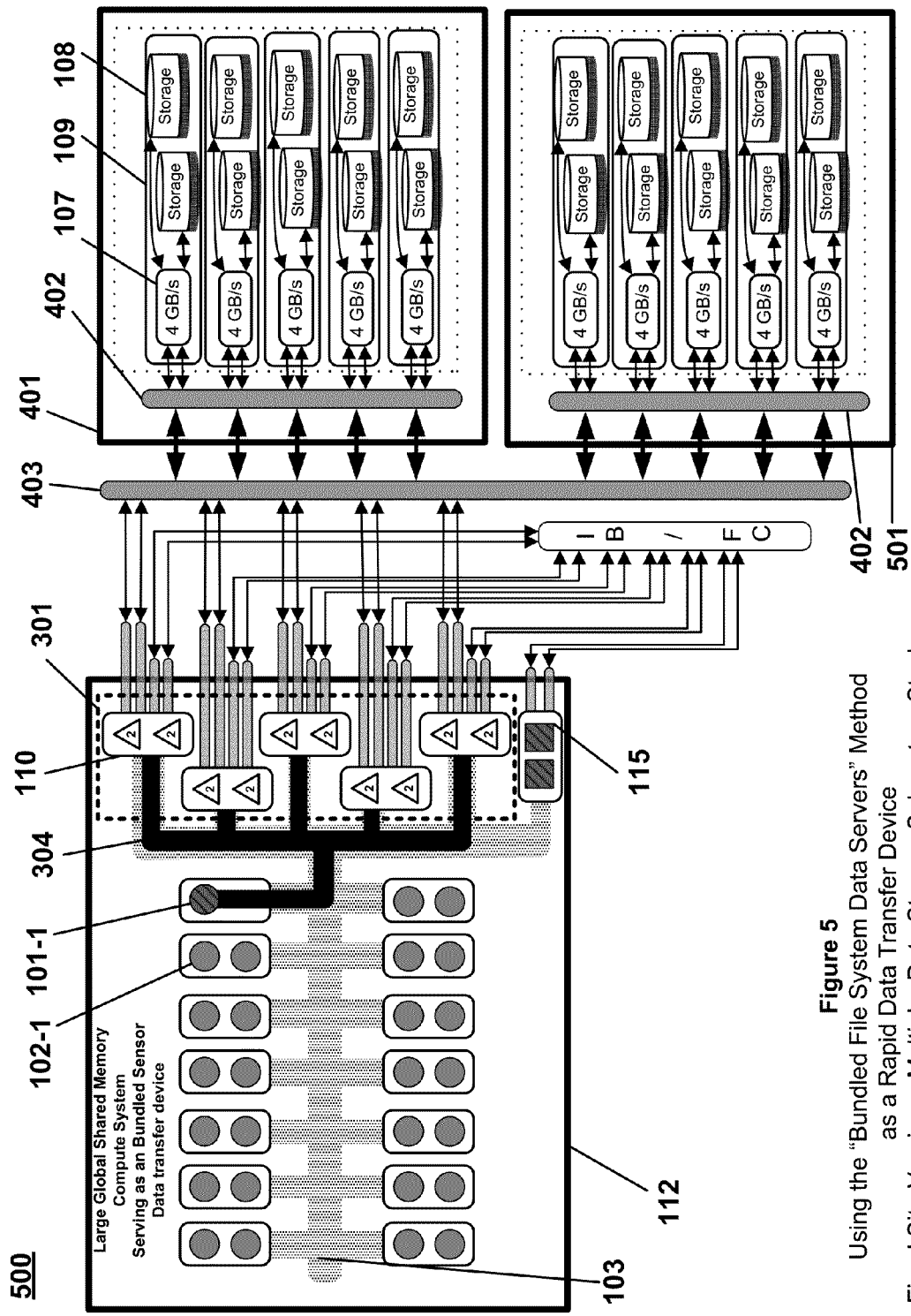
FIG. 5 is a depiction of an implementation that utilizes the "Hosted/Bundled File Systems Data Storage Servers" as part of a modularized Data capture and High-Speed Data transfer system for a fixed field site that is used to receive and transfer very large data sets from mobile Sensor systems that generate very large data sets.

The data storage devices are configured in modular transportable assemblies per items 401 and 501 in FIG. 5, that can be quickly connected or dis-connected via the 402 and 403 modular cable assemblies. When a modularized data storage device is being prepped for transport, an orderly shutdown sequence is initiated. Upon completion of the shut down sequence, the specifics about the particular file system or data object system will have been written into a designated startup/shutdown region of the modularized data storage device. Upon re-coupling the transported modularized data storage device, 501, to an alternate "Common Global Shared Memory" compute system, the configuration of the data file system or data object storage systems information will be detected from the designated startup/shutdown region of storage. At that time, the alternate system will re-allocate compute elements within the Common Global Shared Memory compute environment to be used as an additional set of File System Data Storage Servers for the data files system or data object storage system. When the file system or data object storage system of the modularized data storage device, 501, is up and running, a high-speed transfer of the data resident within the modularized data module into the Common Global Shared Memory can occur. In the embodiment depicted in FIG. 5, the contents of the 501 data module could be transferred to the 401 data module at an aggregate rate approaching 20 GB/sec. A much better transfer profile than if a typical transfer was utilized using standard configurations.

Another beneficial advantage of hosting/bundling all of the data storage servers within the same "Common Global Shared Memory," is that the data elements themselves are available to the application compute clients with reduced latency. In a typical Parallel Data Object file system, like Lustre or IBM's GPFS file system, the data elements are "physically/logically" moved to an application compute client in the following sequence:

1—A data element "Alpha" resides in FIG. 2 on a storage device 108 within storage subsystem 109,
2—After a read request for is received for data element "Alpha," it is copied into storage controller 107 (move #1),
3—Then data element Alpha is moved into one or more of the file system data servers, 110 (move #2),
4—Then it is moved into the machine running the file system client for the application compute client, 101-1 and 102-2, to act upon it (move #3).

In this example, data element "Alpha" was moved three times before getting to the application compute element. In the proposed situation, where all of the file system data servers or object storage servers are all part of the same "Common Global Shared Memory," the data movement sequence would be as follows:

1—A data element "Alpha" resides in FIG. 3 on a storage device 108 within storage subsystem 109,
2—After a read request is received for data element "Alpha," it is copied into storage controller 107 (move #1),
3—Then data element Alpha is moved into one or more of the file system data servers resident within the common global shared memory system, 110 of FIG. 3 (move #2),
4—At this point, data element Alpha is available for use by the application compute clients, 101-1 and 102-1 also residing with the same common global shared memory compute system. Data element Alpha moved two times before becoming available to the application compute client.

In the case where the data storage subsystem is a JBOD collection of disks or Solid State Disk drives, without a storage controller, the number of data moves would be reduced down to one! Data element Alpha would be moved from a disk or SSD, and placed directly into the memory address space allocated by the file system storage server, where it would be available for use by an application compute client via direct memory access.

The system and method of Hosting/Bundling all of the files system data servers in the same common global shared memory compute system provides for increased aggregate I/O bandwidth performance with the added benefit of reducing the latency times for accessing specific data sets. The prior art systems and methods utilized various schemes for parallel computing and parallel I/O, and all made reference to various connectivity configurations, but none of them included the incorporation of all file system or data storage system computation within the same system common global shared memory as the application compute client.

SUMMARY

A single file system or data object storage application compute client process in a large compute system (hundreds to thousands of compute cores), or a small compute system (a few dozen compute cores) is typically limited to sharing only a small portion of the total aggregate data I/O bandwidth available in today's modern data file system's or data object storage's systems total I/O bandwidth. Many of today's very high bandwidth data file systems or object storage systems derive their total "file system" I/O bandwidth by aggregating data I/O access from multiple, physical file system data storage servers or data object storage servers that are themselves orchestrating and conveying data I/O access from their physically or logically attached "back-end" data storage devices and systems. The percentage share of total file system or data object storage I/O bandwidth available for a single file system client is dropping as current and planned implementations of modern data file systems and data object storage systems grow in total aggregate I/O bandwidth from 200-300 Giga Bytes/sec to well over 1 Tera Bytes/sec. The I/O bandwidth available for a specific file system application compute client from the entire aggregate set of file system's data storage servers or data object storage servers are limited by many factors. A primary factor for limiting file system or data object storage client I/O is the number of "client I/O network pathways" that are supported by the specific file system's design, and the bandwidth capacity the of the I/O network pathways that are linking the multiple file system data storage servers to the specific file system client process.

Performance for typical file system or data storage systems client I/O will range from approx. 1.5 GB/sec to 3.0 GB/sec. Even 3.0 GB/sec is not a very large share of client I/O bandwidth performance when compared to aggregate file system I/O bandwidth figures that are now exceeding 1,000 GB/sec. This I/O client bandwidth limitation can be alleviated by physically or logically hosting the entire set of file system data storage servers or data object storage servers within the same common global shared memory, parallel compute system, as the specific application compute client process.

The efficient hosting of the data file systems' storage servers or data object storage servers full complement of file system data storage servers in the same "Common Global Shared Memory" compute system as the specific application compute client process would require the careful integration of the following major sub elements of the "Common Global Shared Memory" compute system:

1—For all hosted File System Data Storage Servers— Appropriately sized physical or logical connections between each specific "run time" instance of a specific File System Data Storage Servers process and it's specific "Back-End" data storage device or data storage system, 2—All of the required File System Data Storage Servers software processes for the File System specific I/O data handling of all data-blocks and data-streams between the File System Client and the File System Data Storage Servers physical or logical data storage devices or systems, 3—Methods and processes implemented using appropriate shared memory and process semaphoring systems application programming interface commands for the application compute client to have I/O client "Run time" processes to provide access to the appropriate memory regions of the "Common Global Shared Memory" compute system so that the total I/O bandwidth between the specific application compute client and the aggregate I/O provided by all of the "Common Global Shared Memory" hosted File System Data Storage Servers is increased up to the limit of the I/O memory bandwidth of the "Common Global Shared Memory" compute system.

This system and method would allow a specific application compute client to access the "Entire Aggregate Bandwidth" provided by all of the File System Data Storage Servers processes up to the bandwidth limit of the "common Global Shared Memory" compute system. File System Clients external to the "Hosted File System Servers Shared-Memory compute system" would still be subject to the same "Channel I/O link" limiting factors, but would still have shared access to the hosted File Systems. Processes running within the "Common Global Shared Memory compute system would be serviced by internal File System Clients via shared-memory access and would have full I/O access up to the limit of bandwidth of the Common Global Shared Memory compute system with the additional benefit of minimizing data access latency due to the reduced number of data movements.

OPERATION

The operation of the data file systems' or data object storage systems' "Hosted/Bundled" data storage servers, is the same as if they were implemented in physically separate servers. Lustre OSS servers still stripe data blocks across the storage subsystems and storage devices under the direction of the file system application compute clients. The data I/O performance and operation of the specific application compute client file system I/O client or data object storage client, operating within the "Common Global Shared Memory" compute system is increased since it is no longer limited by an Infiniband or fibrechannel connection. It has access to the entire I/O Bandwidth of the entire parallel file system aggregated from all of the OSS servers, or NSD servers in the case of IBM's GPFS.

What is claimed is:

1. A system for increasing application compute client data input/output (I/O) bandwidth performance within a parallel computing environment comprising:

A. a plurality of compute elements, each element of which is operatively and communicatively coupled via a common global shared memory within said parallel computing environment;

B. a non-zero subset of said plurality of compute elements, wherein said subset of compute elements are designated as application compute clients, each of which is allocated to execute client applications and data file system I/O clients and/or data object storage system I/O clients;

C. a non-zero subset of said plurality of compute elements, wherein said subset of compute elements are designated as data file system storage servers, and/or data object storage servers, each of which is allocated to execute data file system software processes and/or data object storage system software processes, wherein said data storage servers are operatively and communicatively coupled to a plurality of data storage devices, wherein each said data storage devices is operatively and communicatively coupled to two or more of said data storage servers, said data storage servers comprise the entirety of data I/O available for said instance of the data file system or for said instance of the data object storage system, wherein said data storage servers receive data I/O client requests issued by one or more of the application compute clients via the application interface of the specific parallel file system or via parameters set within the common global shared memory, wherein said data storage servers process said data I/O client requests from said application compute clients, wherein said I/O client processing by the data storage servers is comprised of:

an appropriate operating systems application programming interface command means to allocate memory address locations within the common global shared memory address space, for each data file or data object requested by the application compute clients' data I/O request, and an appropriate operating systems application programming interface command means for communicating to the application compute clients', the global shared memory address locations corresponding to said data I/O request, via the common global shared memory, for each data file and/or data object access requested by said application compute client I/O request; and an appropriate data storage device driver systems application programming interface command means for said data storage servers to retrieve data files or data objects from the plurality of said data storage devices, in response to said application compute clients' I/O request, and operatively placing said data files or data objects into said memory address locations as previously allocated within the common global shared memory; and an appropriate data storage device driver systems application programming interface command means for said data storage servers to retrieve data files or data objects from said memory address locations allocated within the common global shared memory, and placing said data files or data objects into the plurality of storage devices in response to said application compute clients' I/O request; and an appropriate operating systems application programming interface command means for said data storage servers to reply to the application compute client, via the common global shared memory, upon completion of said application compute client data I/O request;

Whereby, said application compute clients can directly access said data files and/or data objects that reside within common global shared memory, in accordance with the data I/O response received via common global shared memory, from said data storage servers, and the access to said data files or data objects within the common global shared memory will occur at or below the I/O bandwidth rates of the common global shared memory.

2. The system of claim 1, wherein the compute elements subsets designated as application compute clients or data storage servers are implemented as virtual machines all within said common global shared memory system.

3. The system of claim 1,
wherein additional non zero subset of storage server nodes are designated as spare storage server nodes,
wherein said subset of spare storage server nodes are operatively recording & maintaining the status of all I/O transactions within said data file system or object data storage,
whereby said spare storage server nodes can be operatively utilized as replacement storage server nodes upon notification by active client application nodes or I/O client processes, upon failure of an active storage server node.

4. The system of claim 1, further comprising:
that said subset of compute elements designated as data storage servers within common global shared memory are operatively and communicatively coupled to external communications fabrics,
wherein said data storage servers receive data I/O client requests issued by one or more of the external application compute clients via the external communications fabrics;
wherein said data storage servers process said data I/O client requests from said external application compute clients and;
wherein said I/O client processing by the data storage servers is comprised of:
an appropriate operating systems application programming interface command means for communicating with the external application compute clients', the address locations corresponding to said data I/O request, via the external communications fabrics, for each data file or data object access requested by said application compute client I/O request;

an appropriate data storage device driver systems application programming interface command means for said data storage servers to retrieve data files or data objects from the plurality of said data storage devices, in response to said external application compute clients' I/O request, and operatively placing said data files or data objects into locations as determined by the parameters within the external application client's I/O request via the external communications fabric;
an appropriate operating systems application programming interface command means for said data storage servers to retrieve data files or data objects from said external application compute clients via the external communications fabrics, and placing said data files or data objects into the plurality of storage devices in response to said external application compute clients' I/O request;
an appropriate operating systems application programming interface command means for said data storage servers to reply to said external application compute client, via the external communications fabrics, upon completion of said application compute client data I/O request.

5. The system of claim 1, further comprising:
additional subsets of said compute elements are designated to host one or more additional data file systems or data object storage systems within the common global shared memory,
wherein said additional data file systems or data object storage systems can transfer data files or data objects via the common global shared memory to the other instances of the data file systems or data object storage systems.

6. The system of claim 5, further comprising:
said additional subsets of data storage servers, each of which is operatively and communicatively coupled to data storage devices packaged as a modular or transportable data storage devices,
wherein said modularized data storage devices contain configuration data elements specific to the scheme of the data file system or the scheme of the data object storage system, contained within the modularized data storage devices,
wherein said modularized data storage modules can be configured for an orderly shutdown,
wherein the shutdown sequence of said modular data storage device includes the writing of said file system configuration elements or data object storage configuration items to be saved in a designated startup/shutdown data storage location within said modular data storage device,
wherein after an orderly shutdown sequence, the modularized data storage device can be de-coupled from said system and physically moved to an alternate system,
wherein said modularized data storage device is re-coupled to said alternate system,
wherein said alternate system detects the file system configuration elements contained within the startup/shut/down location within said modularized data storage device,
wherein said alternate system designates a specific subset of said compute elements within said common global shared memory of said alternative system based on the information provided in the startup/shutdown location within said modular data storage device, to be allocated as data storage servers for the data file system or data object storage system resident within the modularized data storage device, whereby application compute clients residing within said alternate system can request the transfer of all data files or data objects residing within said modular data storage device at I/O transfer rates up to the level of the performance of the common global shared memory in combination with the collective I/O performance of the modular data storage device.

7. A method for increasing application compute client data input/output (I/O) bandwidth performance within a parallel computing environment comprising the steps of:

A. establishing a plurality of compute elements, each element of which is operatively and communicatively coupled via a common global shared memory within said parallel computing environment;

B. separating said compute elements into a non-zero subset of said plurality of compute elements, wherein said subset of compute elements are designated as application compute clients, each of which is allocated to execute client applications and data file system I/O clients and/or data object storage system I/O clients;

C. separating said compute elements into a non-zero subset of said plurality of compute elements, wherein said subset of compute elements are designated as data file system storage servers, or data object storage servers, each of which is allocated to execute data file system software processes or data object storage system software processes, wherein said data storage servers are operatively and communicatively coupled to a plurality of data storage devices, wherein each said data storage devices is operatively and communicatively coupled to two or more of said data storage servers, said data storage servers comprise the entirety of data I/O available for said instance of the data file system or for said instance of the data object storage system, wherein said data storage servers receive data I/O client requests issued by one or more of the application compute clients via the common global shared memory;

wherein said data storage servers process said data I/O client requests from said application compute clients;

wherein said I/O client processing by the data storage servers is comprised of:

an appropriate operating systems application programming interface command means to allocate memory address locations within the common global shared memory address space, for each data file or data object requested by the application compute clients' data I/O request;

an appropriate operating systems application programming interface command means for communicating to the application compute clients', the global shared memory address locations corresponding to said data I/O request, via the common global shared memory, for each data file or data object access requested by said application compute client I/O request;

an appropriate data storage device driver systems application programming interface command means for said data storage servers to retrieve data files or data objects from the plurality of said data storage devices, in response to said application compute clients' I/O request, and operatively placing said data files or data objects into said memory address locations as allocated within the common global shared memory;

an appropriate operating systems application programming interface command means for said data storage servers to retrieve data files or data objects from said memory address locations allocated within the common global shared memory, and placing said data files or data objects into the plurality of storage devices in response to said application compute clients' I/O request;

an appropriate operating systems application programming interface command means for said data storage servers to reply to the application compute client, via the common global shared memory, upon completion of said application compute client data I/O request;

Whereby, said method allows said application compute clients to directly access said data files or data objects that reside within common global shared memory, in accordance with the data I/O response received via common global shared memory, from said data storage servers, and the access to said data files or data objects within the common global shared memory will occur at or below the I/O bandwidth rates of the common global shared memory.

8. The method of claim 7, wherein the compute elements subsets designated as application compute clients or data storage servers are implemented as virtual machines all within said common global shared memory system.

9. The method of claim 7, wherein additional non-zero subset of storage server nodes are designated as spare storage server nodes, wherein said subset of spare storage server nodes are operatively recording & maintaining the status of all I/O transactions within said data file system or object data storage, whereby said spare storage server nodes can be operatively utilized as replacement storage server nodes upon notification by active client application nodes or I/O client processes, upon failure of an active storage server node.

10. The method of claim 7, further comprising:

that said subset of compute elements designated as data storage servers within common global shared memory are operatively and communicatively coupled to external communications fabrics, wherein said data storage servers receive data I/O client requests issued by one or more of the external application compute clients via the external communications fabrics;

wherein said data storage servers process said data I/O client requests from said external application compute clients and;

wherein said I/O client processing by the data storage servers is comprised of:

an appropriate operating systems application programming interface command means for communicating with the external application compute clients', the address locations corresponding to said data I/O request, via the external communications fabrics, for each data file or data object access requested by said application compute client I/O request;

an appropriate data storage device driver systems application programming interface command means for said data storage servers to retrieve data files or data objects from the plurality of said data storage devices, in response to said external application compute clients' I/O request, and operatively placing said data files or data objects into locations as determined by the parameters within the external application client's I/O request via the external communications fabric;

an appropriate operating systems application programming interface command means for said data storage servers to retrieve data files or data objects from said external application compute clients via the external communications fabrics, and placing said data files or data objects into the plurality of storage devices in response to said external application compute clients' I/O request;

an appropriate operating systems application programming interface command means for said data storage servers to reply to said external application compute client, via the external communications fabrics, upon completion of said application compute client data I/O request.

11. The method of claim 7, further comprising:

provisioning for additional subsets of said compute elements are designated to host one or more additional data file systems or data object storage systems within the common global shared memory, wherein said additional data file systems or data object storage systems can transfer data files or data objects via the common global shared memory to the other instances of the data file systems or data object storage systems.

12. The method of claim 11, further comprising:

provisioning for said additional subsets of data storage servers, each of which is operatively and communicatively coupled to data storage devices packaged as a modular or transportable data storage devices, wherein said modularized data storage devices contain configuration data elements specific to the scheme of the data file system or the scheme of the data object storage system, contained within the modularized data storage devices, wherein said modularized data storage modules can be configured for an orderly shutdown, wherein the shutdown sequence of said modular data storage device includes the writing of said file system configuration elements or data object storage configuration items to be saved in a designated startup/shutdown data storage location within said modular data storage device, wherein after an orderly shutdown sequence, the modularized data storage device can be de-coupled from said system and physically moved to an alternate system, wherein said modularized data storage device can be re-coupled to said alternate system, wherein said alternate system detects the file system configuration elements contained within the startup/shut/down location within said modularized data storage device, wherein said alternate system designates a specific subset of said compute elements within said common global shared memory of said alternative system based on the information provided in the startup/shutdown location within said modular data storage device, to be allocated as data storage servers for the data file system or data object storage system resident within the modularized data storage device, whereby application compute clients residing within said alternate system can request the transfer of all data files or data objects residing within said modular data storage device at I/O transfer rates up to the level of the performance of the common global shared memory in combination with the collective I/O performance of the modular data storage device.

* * * * *